United States Patent [19]
Sedlatschek et al.

[11] 3,953,177
[45] Apr. 27, 1976

[54] CERMET MATERIALS WITH METAL FREE SURFACE ZONES

[75] Inventors: Karl Sedlatschek, Reutte; Friedrich Heitzinger, Lechaschau, both of Austria

[73] Assignee: Schwarzkopf Development Corporation, New York, N.Y.

[22] Filed: Jan. 9, 1974

[21] Appl. No.: 431,976

Related U.S. Application Data

[63] Continuation of Ser. No. 218,583, Jan. 17, 1972, abandoned.

[30] Foreign Application Priority Data

Jan. 20, 1971   Austria .................................. 470/69

[52] U.S. Cl. .............................. 29/182.2; 29/182.5; 75/200; 75/206; 75/208 R
[51] Int. Cl.² ........................................... B22F 7/00
[58] Field of Search ................. 75/200, 206, 208 R; 29/182.1, 182.2, 182.5

[56] References Cited
UNITED STATES PATENTS

| | | | |
|---|---|---|---|
| 3,148,981 | 9/1964 | Ryshkewitch | 75/208 R X |
| 3,150,443 | 9/1964 | Alexander et al. | 75/200 X |
| 3,165,821 | 1/1965 | Breton | 75/206 X |
| 3,177,077 | 4/1965 | Eyraud et al. | 75/208 R X |
| 3,526,485 | 9/1970 | Dawihl et al. | 29/182.5 |
| 3,551,991 | 1/1971 | Reich et al. | 75/208 R X |
| 3,647,576 | 3/1972 | Yamamura et al. | 29/182.5 X |

*Primary Examiner*—Richard D. Lovering
*Assistant Examiner*—Edward A. Miller
*Attorney, Agent, or Firm*—Morgan, Finnegan, Pine, Foley & Lee

[57] ABSTRACT

A novel cermet material and a process for its production is disclosed. The cermet material is characterized by a surface zone which is substantially free of metal.

9 Claims, No Drawings

CERMET MATERIALS WITH METAL FREE SURFACE ZONES

This is a continuation of application Ser. No. 218,583, filed Jan. 17, 1972 now abandoned.

BACKGROUND OF THE INVENTION

Cermet materials, consisting of finely divided ceramic and metallic components, combine to a certain degree the advantageous characteristics of the metals, e.g., their good electrical and thermal conductivity and the advantageous properties of the ceramics, e.g., their good corrosion resistance. For this reason, Cermet materials consisting of refractory oxides, e.g., alumina or zirconia, and refractory metals, e.g., molybdenum or tungsten, have proved highly suitable for making structural parts in contact with molten metals. In many instances, however, there is the problem of how to give such cermet parts a nonmetallic surface coating. The known methods for producing such coatings, e.g., by spraying or sintering, are not satisfactory because the coating is not sufficiently firmly bonded to the base. These deficiencies are overcome by the present invention.

DESCRIPTION OF THE INVENTION

The invention relates to a shaped cermet part consisting of a ceramic skeleton in which the metallic components are embedded. The shaped ceramic part according to the invention is characterized by the fact that it has a surface zone formed of the ceramic skeleton which is free of metallic components. The non-metallic surface zones of the shaped cermet parts in accordance with the invention form part of the ceramic base skeleton and are thus firmly bonded to the latter. Hence, the non-metallic surface zone does not separate from the base when subjected to high mechanical and/or thermal stresses.

As used herein, the term "surface zone" refers to an external portion of the cermet material from which it is desirable to selectively remove the metal. For different applications the surface zone may be a relatively thin or relatively thick layer which may be obtained according to the disclosed process. The metal free surface zone may vary from 01 mm to 5 mm in depth, depending on the size and intended use of the cermet object. By means of this invention, the entire surface or only a portion of the surface of the object may be rendered free of metallic components.

As the first step in carrying out this invention, a cermet material is produced in the desired shape by conventional means. For example, the starting materials, metal powder and ceramic powder are intimately mixed. By known methods of shaping, e.g. compacting in steel dies, slip casting, extrusion using suitable lubricant additions, isostatic pressing, etc., shaped parts can be made from these powder mixtures. Conventionally, the shaped parts are then sintered. The preferred sintering temperature is from about 0.6 to 0.9 of the absolute melting temperature of the higher melting component. In some cases it is possible to carry out the sintering at a temperature above the melting point of the lower-melting phase (liquid phase sintering). Another possibility is hot pressing of the powder mixture.

The above-described methods furnish sintered parts in which both the ceramic and the metallic component form mutually interpenetration skeletons. Skeleton formation begins when one component is present in a quantity of 15 Vol.% and is already pronounced at 25% Vol.%.

Another known method of producing the cermet base consists in infiltrating a porous skeleton of ceramic, made by sintering, with molten metal.

The invention contemplates cermet materials which have from 15–80 percent, by volume of a ceramic material in combination with a metal. The preferred compositions have a range of 30–70 percent by volume of ceramic material. As conventionally produced, these cermet materials will have metal in the surface zone.

The refractory metals tungsten and molybdenum but also the metals chromium, iron, nickel, cobalt, and copper and in some cases the noble metals silver, gold, and platinum are suitable for the metallic components of the aforedescribed materials. Certain alloys may also be employed, as is known in the art. The oxides of aluminum, thorium, beryllium, titanium, zirconium, hafnium, magnesium, calcium, chromium, cerium, silicon, and yttrium can be used as the ceramic component, either singly or in the form of mixed oxides.

As illustrations of the suitable oxides there may be mentioned $Al_2O_3$, $BeO$, $ThO_2$, $TiO_2$, $Y_2O_3$, $ZrO_2$, $MgO$, $CaO$, $CeO_2$, $SiO_2$, $Cr_2O_3$ and $HfO_2$.

The cermet parts made by one of the above described methods can then be turned, milled or brought to their final form by some other machining of finishing method.

By means of this invention, non-metallic surface zones bonded to the base skeleton can be produced by removing the metallic components in the desired portions of the surface. This is done by selectively removing the metal from the surface zones with chemical agents which do not attack the ceramic phase.

Chemical agents which can selectively remove metals are chemicals which dissolve the metal or react with the metal to form another substance which separates from the cermet, i.e., by dissolution or mixture with the chemical agent. The identity of such chemical agents are well known to the art. For example, nitric acid, hydrochloric acid, sulfuric acid, phosphoric acid and various mixtures thereof e.g., aqua regia or ferric chloride solutions, ammonium persulfate solutions and the like may be used to selectively remove various metals. Those skilled in the art will be able to select an appropriate material based on the particular metal to be removed. For example, copper may be removed with ferric chloride solution from an alumina skeleton; gold may be removed from a zirconia skeleton with aqua regia; iron may be removed from a silicon dioxide skeleton with sulfuric acid; chromium may be removed from a silicon dioxide skeleton with hydrochloric acid; and molybdenum may be removed from a silicon dioxide skeleton with nitric acid. In particular cases those skilled in the art will appreciate that many other materials may be employed.

If, for technical reasons, certain surface areas are to remain in the original conditions, i.e., contain the metallic phase, these can be protected by a coating, for example of wax or other material which will resist the action of the etching agent. This resist material may be applied to the surface of the cermet substrate prior to the removal of the metal from the surface areas in any desired predetermined zone or configuration. After the metal is removed from the unmasked areas, the resist material may be removed to provide access to the metallized areas.

The removal of the metal from the surface can be carried out by chemical or electrochemical dissolution. By controlling the duration of the solution process it is possible to obtain a surface layer with the desired thickness. In principle it is also possible to control the dissolution in such a manner that the thickness of the surface layer varies.

The above described process gives porous surface zones. Subsequent annealing of the material following the removal of the metallic component causes a marked strengthening of the ceramic surface layer. A further increase in strength and hardness of the ceramic surface can also be achieved by infiltrating the porous ceramic surface skeleton with suspensions or solutions of nonmetallic components and subsequently densifying and consolidating the latter by an annealing treatment which comprises a heating procedure at 90°C – 2400°C.

The production of shaped cermet parts in accordance with the invention is further illustrated by means of the following examples:

EXAMPLE I

Fine molybdenum powder and powdered alumina (particle size of both components under 10 microns) are mixed in 1:1 ratio, pressed at 4 tons/cm$^2$ to shaped parts and then sintered at 1900°C in argon. The parts of the surface where the ceramic zones are desired, are than etched for six minutes with concentrated nitric acid (65 percent) with an addition of 50 Vol percent of hydrochloric acid. The etching solution is then removed from the cermet part by repeatedly washing and drying the etched area. The part then has an approximately 0.3 mm thick porous ceramic surface zone having a very high electrical resistance. Subsequent annealing at 1700°C for 120 minutes considerably strengthens the surface layer with further increase in the electrical resistance of the same.

EXAMPLE II

In analogy to the foregoing method, a cermet part consisting of 40 Vol. % zirconia and 60 Vol. % molybdenum is made. The desired non-metallic surface zones are formed by etching for 10 minutes with a 2:1 solution of concentrated nitric and hydrochloric acid. The etching solution is then removed by washing and drying from the cermet. A porous, non-conducting surface zone is first formed. By infiltrating this with water glass and subsequent annealing, a dense, mechanically strong layer having a very high electrical resistance is formed.

Owing to their special characteristics, the cermet parts in accordance with the invention find a number of applications, based on the fact that the physical properties of the surface zones, which are firmly bonded to the base, are utilized in combination with those of the base material. Some examples are the following:

When susceptors of induction furnaces are in operation, there is frequently a possibility of undesirable consequences due to contact between the susceptors and the material to be heated or the crucible material. For example, when molybdenum susceptors are used in combination with platinum crucibles, reactions can occur which result in damage to the crucibles. If, however, a shaped cermet part of molybdenum and magnesia with partly non-metallic surface zones is used instead of a susceptor made of pure molybdenum, these difficulties are avoided. Contact between the susceptor and the platinum crucible neither gives rise to undesirable reactions nor to arcing between these parts.

In shaped cermet parts in which the ceramic phase consists of stabilized zirconia, it is also possible to make practical use of the oxygen ion conductivity of the surface zone. When such a part having a zirconia surface zone is immersed in a molten metal, an electrical voltage is generated in consequence of the different oxygen activities at the two boundaries of the surface oxide layer depending on the oxygen activity and temperature of the melt. Simultaneous measurement of the temperature of the melt then permits the oxygen content of the latter to be determined.

The higher thermal emission of nonmetallic materials compared with metals can also be utilized in the shaped cermet parts in accordance with the invention. These can be employed as heating elements which not only have a surface with good emission properties but also an interior with high electrical conductance.

A frequent problem in highvacuum engineering is that of insulating metallically conductive parts by thin layers with high resistance. These parts are frequently subjected to high temperatures. Cermet parts containing molybdenum plus alumina, thoria or beryllia, are suitable for this purpose, provided that layers having a high resistance are created on the surface by dissolving the molybdenum. A special application of this type is the use of the new material in heat insulations operating at high temperatures. For example, it has been proposed previously to insulate rotating x-ray targets from their axis by ceramic materials in order to prevent the heat formed in the target from being conducted away through the axis. Ceramic materials have not always proved very suitable for this purpose because of their comparative brittleness. A simple cermet part cannot be used because its thermal conductivity is too high. Using the new materials, however, the problem can be solved because the core has sufficient ductility while the surface can be made heat-insulating.

Numerous other applications for the new material, can of course also be found. The foregoing examples are merely intended to illustrate the invention which is of course not limited to these. The new material can always be used to advantage when the properties of relatively thin ceramic layers, firmly bonded to a base body having good thermal and electrical conductivity, are to be exploited.

We claim:

1. A cermet material which consists essentially of a ceramic and a metal, said ceramic being selected from the group consisting of the oxides of aluminum, thorium, beryllium, titanium, zirconium, hafnium, magnesium, calcium, chromium, cerium, silicon and mixtures thereof, said cermet material having a surface zone that consists essentially of a ceramic skeleton in which said surface zone has been strengthened by the infiltration of a non-metallic component.

2. A cermet material as defined in claim 1 wherein the metal is selected from the group consisting of tungsten, molybdenum, chromium, iron, nickel, cobalt, copper, silver, gold, platinum and mixtures thereof.

3. A cermet material as defined in claim 1 wherein the ceramic component is present in an amount of from about 15 to about 80 percent by volume.

4. A cermet material as defined in claim 1 wherein the ceramic component is present in an amount of from about 30 to about 70 percent by volume.

5. A cermet material as defined in claim 1 which is substantially completely free of metal in its surface zones over the entire surface of said cermet material.

6. A cermet material as defined in claim 1 which comprises molybdenum and alumina wherein the surface zone is substantially completely free of molybdenum.

7. A cermet material as defined in claim 1 which comprises molybdenum and zirconia wherein the surface zone is substantially completely free of molybdenum.

8. A cermet material as defined in claim 1 wherein the surface zone has been infiltrated with water glass.

9. A cermet material which consists essentially of a ceramic selected from the group consisting of the oxides of aluminum, thorium, beryllium, titanium, zirconium, hafnium, magnesium, calcium, cerium, silicon, yttrium and mixtures thereof and a metal selected from the group consisting of tungsten, molybdenum, chromium, iron, nickel, cobalt, copper, silver, gold, platinum and mixtures thereof, said cermet material having a ceramic base skeleton and a surface zone that extends from the surface to a depth of from 0.01 mm to 5 mm that consists essentially of a ceramic skeleton that is substantially free of metal and has been strengthened by the infiltration of a non-metallic component.

* * * * *